(12) United States Patent  (10) Patent No.: US 7,902,307 B2
Lewalle  (45) Date of Patent: Mar. 8, 2011

(54) OLEFIN POLYMERIZATION PROCESS WITH OPTIMIZED PRODUCT DISCHARGE

(75) Inventor: Andre Lewalle, Brussels (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/690,244

(22) Filed: Jan. 20, 2010

(65) Prior Publication Data
US 2010/0120999 A1    May 13, 2010

Related U.S. Application Data

(60) Continuation of application No. 11/502,004, filed on Aug. 9, 2006, now abandoned, and a continuation of application No. 12/243,346, filed on Oct. 1, 2008, which is a division of application No. 11/057,715, filed on Feb. 14, 2005, now abandoned.

(60) Provisional application No. 60/544,846, filed on Feb. 13, 2004.

(30) Foreign Application Priority Data

Feb. 13, 2004   (EP) .................................... 04100578

(51) Int. Cl.
*C08F 2/12*    (2006.01)
*G05D 9/00*    (2006.01)
*B01J 19/00*   (2006.01)

(52) U.S. Cl. ................ 526/64; 526/72; 526/88; 526/89; 422/106; 422/108

(58) Field of Classification Search ................... 526/64, 526/72, 88, 89; 422/106, 108
See application file for complete search history.

(56) References Cited

U.S. PATENT DOCUMENTS 3,242,150 A  * 3/1966 Scoggin .......................... 526/64
3,293,000 A  * 12/1966 Marwil .......................... 422/132

* cited by examiner

*Primary Examiner* — David Wu
*Assistant Examiner* — Elizabeth Eng
(74) *Attorney, Agent, or Firm* — Tenley R. Krueger

(57) ABSTRACT

The present invention relates to a polymerization process for producing olefin polymers in a loop reactor comprising the steps of: introducing into the loop reactor one or more olefin reactants, polymerization catalysts and diluents, and while circulating said reactants, catalysts and diluents, polymerizing said one or more olefin reactants to produce a polymer slurry comprising essentially liquid diluent and solid olefin polymer particles, said process further comprising one or more cycles of: (a) allowing said polymer slurry to settle in one or more setting legs connected to said reactor, and (b) discharging from a setting leg a predetermined volume of polymer slurry substantially equal to the volume of polymer slurry settled in said settling leg since its previous discharge.

7 Claims, 3 Drawing Sheets

OLEFIN POLYMERIZATION PROCESS WITH OPTIMIZED PRODUCT DISCHARGE

CROSS-REFERENCE TO RELATED APPLICATIONS

This application claims the benefit of U.S. patent application Ser. No. 11/502,004, filed Aug. 9, 2006 and U.S. patent application Ser. No. 12/243,346, filed Oct. 1, 2008, which claims priority from U.S. patent application Ser. No. 11/057,715, filed Feb. 14, 2005, which claims priority from U.S. Provisional Pat. Appl. Ser. No. 60/544,846, filed Feb. 13, 2004.

FIELD OF THE INVENTION

The present invention relates to improvements in the removal of polymer scurry from a reactor for olefin slurry polymerization. The present invention further relates to a polymerization process occurring in a loop reactor wherein discharge of the settled polymer slurry is optimized.

BACKGROUND OF THE INVENTION

Olefin polymerizations such as ethylene polymerization are frequently carried out using monomer, diluent and catalyst and optionally co-monomers in a loop reactor. The polymerization is usually performed under slurry conditions, wherein the product consists usually of solid perfidies and is in suspension in a diluent. The slurry contents of the reactor are circulated continuously with a pump to maintain efficient suspension of the polymer solid particles in the liquid diluent, the product being often taken off by means of settling legs which operate on a batch principle to recover the product. Settling legs are used to increase the solids concentration of the slurry finally recovered as product slurry. The product is further either transferred to another reactor or discharged to a flash tank, through flash lines, where most of the diluent and unreacted monomers are flashed off and recycled. This recycling may be done either through recompression and reinjection to the reactor with or without intermediate purification. An important operational cost is linked to this fluid effluent recycling. The polymer particles are dried, additives can be added and finally the polymer is extruded and pelletized. This technique has enjoyed international success with millions of tons of ethylene polymers being so produced annually.

Optimal behavior of the settling legs is reached when the quantity of recovered polymer is maximized with respect to the amount of fluid effluent that must be recycled, so that the recycling cost may be minimized for a given production rate. Classically, operation of the plant is based on attempting to discharge the same amount of slurry from all settling legs in order to afford equivalent pressure drops when discharging each leg, however this operation may be far from optimal.

Various alternatives to conventional settling legs are known. For example, WO 01/05842 describes an apparatus for removing concentrated slurry from a flowing stream of slurry in a conduit characterized by a channel in an outlet area of the conduit, the outlet being adapted to continuously remove slurry.

EP 0891990 describes an olefin polymerization process wherein the product slurry is recovered by means of a continuous product take off, more in particular by means of an elongated hollow appendage provided on the reactor. Said hollow appendage being in direct fluid communication with a heated flash line and thus being adapted for continuous removal of product slurry.

However the above-described apparatus and processes have the disadvantage that the suspension withdrawn from the reactor still contains a large amount of diluent and of other reactants, such as the monomer, which it is then necessary to subsequently separate from the polymer particles and to treat for the purpose of reusing it in the reactor.

It is therefore an object of the present invention to provide a polymerization process occurring in a loop reactor wherein discharge of the settled polymer slurry is optimized. Mother object of the invention is to provide processes wherein the settling efficiencies of the polymer slurry and its further discharge is optimized. A yet further object of the present invention is to decrease the fluid effluent throughput at a given polymer production rate by the use of optimized discharge. It is another object to provide a loop reactor having optimized settling legs.

SUMMARY OF THE INVENTION

The present objects are achieved by the processes and devices according to the present invention.

The present invention therefore relates to a polymerization process for producing olefin polymers in a loop reactor comprising the steps of introducing into the loop reactor one or more olefin reactants, polymerization catalysts and diluents, and while circulating said reactants, catalysts and delimits, polymerizing said one or more olefin reactants to produce a polymer slurry comprising essentially liquid diluent and solid olefin polymer particles, said process further comprising one or more cycles of:

(a) allowing said polymer slurry to settle in one or more settling legs connected to said reactor,
(b) monitoring the volume of polymer slurry settled in a settling leg since its previous discharge,
(c) discharging from said settling leg, a predetermined volume of polymer slurry substantially equal to the volume of polymer slurry settled in said settling leg since its previous discharge.

The present invention also relates to a loop reactor suitable for olefin polymerization process comprising: a plurality of interconnected pipes defining a flow path for a polymer slurry, said slurry consisting essentially of an olefin reactant, a polymerization catalyst, liquid diluent and solid olefin polymer particles, means for introducing olefin reactant, polymerization catalyst and diluent into said reactor, a pump suitable for maintaining the polymer slurry in circulation in said reactor, one or more settling legs connected to the pipes of said reactor, at least one measurement means suitable for inferring the volume of settled slurry inside the settling legs such as for example by mathematical or statistical modeling techniques, including neural networks, and at least one valve control means operatively connected to said measurement means and to the valve of said settling legs.

The process and reactor according to the present invention present several advantages over the prior art such as allowing for an optimized discharge of settled slurry from settling legs to a product recovery zone. The volume of polymer slurry that settles in a settling leg may be different from one sewing leg to another according to the position of said settling leg on the loop reactor and its geometrical characteristics. The present process allows the settling legs to be completely emptied of settled material at each discharge without substantially discharging further unsettled slurry that would impose a severe overload to the fluid recycling section for a minimal additional polymer production. The present process also allows that no settled polymer remains in the settling leg at the time it closes. This further significantly decreases the risk of plugging of the settling leg. Indeed such plugging is often due to mass polymerization of the settled slurry remaining under active polymerization conditions in the settling leg, which has poor heat removal characteristics.

The present invention will be further disclosed in detail hereunder. The description is only given by way of example and does not limit the invention. The reference numbers relate to the hereto-annexed figures.

DETAILED DESCRIPTION OF THE INVENTION

Figure 1:
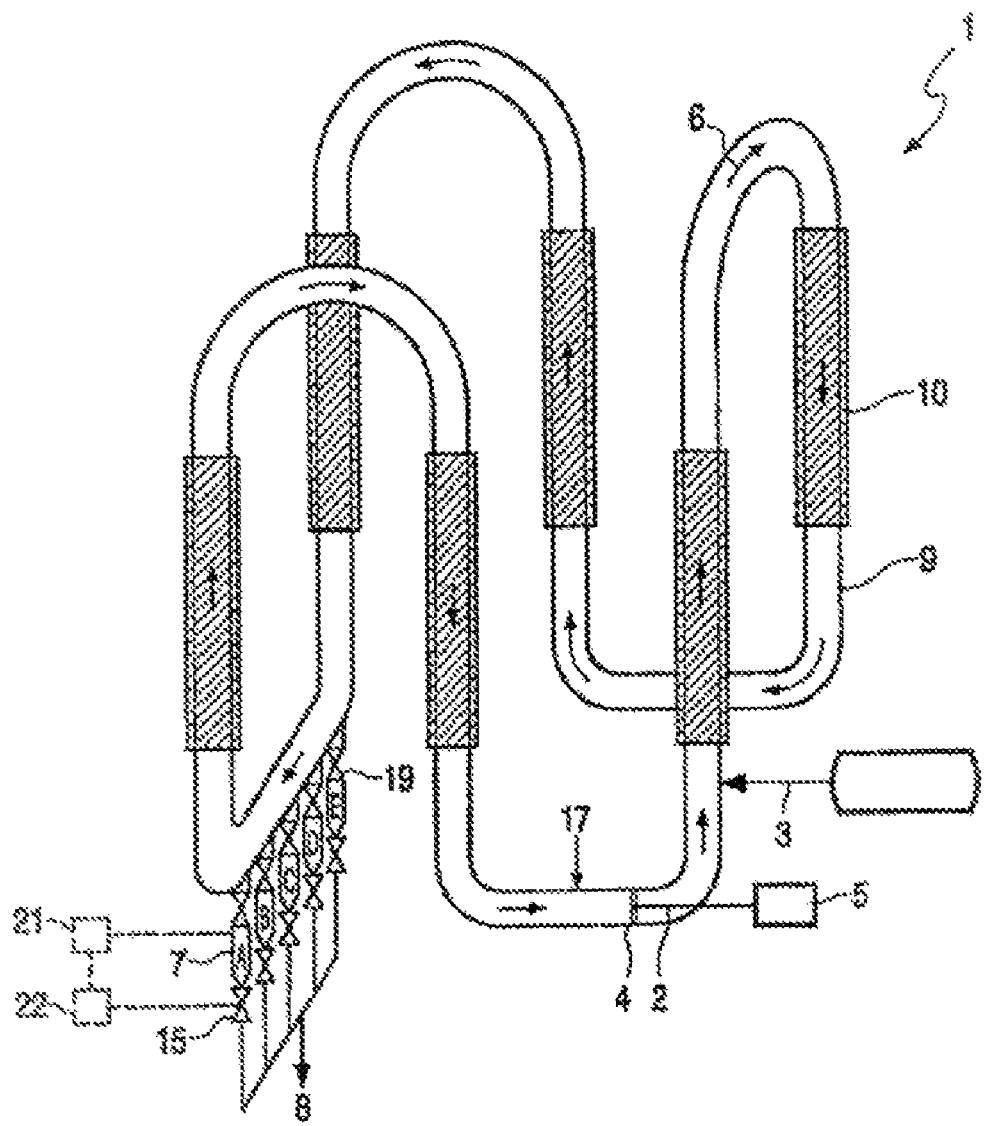
FIG. 1 represents a schematic representation of a single loop polymerization reactor according to an embodiment of the present invention.

The polymerization processes according to the present invention are suitable for any process producing an effluent comprising a slurry of particulate solids suspended in a liquid medium. Such reaction processes include but are not limited to those that have come to be known in the art as particle form polymerizations.

This invention is particularly suitable for polymerization processes occurring in loop reactors for the production of polymer, more particularly polyethylene, wherein a polymerization effluent is formed which is a slurry of particulate polymer solids suspended in a liquid medium, ordinarily the reaction diluent and unreacted reactants.

The present invention is suitable for polymerization process for the manufacture of particulate olefin polymers consisting of the catalytic polymerization or copolymerization of one or several olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene, pentene, butadiene, isoprene, 1-hexene and the like.

The polymerization reaction can be carried out at a temperature of from 50 to 120° C., preferably at a temperature of from 70 to 115° C., more preferably at a temperature of from 80 to 110° C., and at a pressure of from 20 to 100 bars, preferably at a pressure of from 30 to 50 bars, more preferably at a pressure of 37 to 45 bars.

In a preferred embodiment, the present invention is particularly suitable for the polymerization of ethylene in isobutane diluent. Suitable ethylene polymerization includes but is not limited to homopolymerization of ethylene, copolymerization of ethylene and a higher 1-olefin co-monomer such as 1-butene, 1-pentene, 1-hexene, 1-octane or 1-deceits. In an embodiment of the present invention, said co-monomer is 1-hexene.

Ethylene polymerizes in a liquid diluent in the presence of a catalyst, optionally a co-catalyst, optionally a co-monomer, optionally hydrogen and optionally other additives, thereby producing a polymerization slurry.

As used herein, the term "polymerization slurry" or "polymer slurry" or "slurry" means substantially a multi-phase composition inducting at least polymer solid particles and a liquid phase and allowing for a third phase (gas) to be at least locally present in the process, the liquid phase being the continuous phase. The solids include catalyst and polymerized olefin, such as polyethylene. The liquids include an inert diluent, such as isobutane, with dissolved monomer such as ethylene and optionally one or more co-monomers, molecular weight control agents, such as hydrogen, antistatic agents, antifouling agents, scavengers, and other process additives.

Suitable diluents are well known in the art and include hydrocarbons which are inert or at least essentially inert and liquid under reaction conditions. Suitable hydrocarbons include isobutane, n-butane, propane, n-pentane, isopantane, neopentane, isohexane and n-hexane, with isobutane being preferred.

Suitable catalysts are well known in the art. Examples of suitable catalysts include but are not limited to chromium oxide such as those supported on silica, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

The polymerization slurry is maintained in circulation in a loop reactor comprising a plurality of interconnected pipes such as vertical jacketed pipe sections connected through elbows. The polymerization heat can be extracted by means of cooling water circulating in the jacket of the reactor. Said polymerization may be performed in a single or in two or more loop reactors according to the present invention, which can be used in parallel or in series. Said reactors are aimed to operate in a liquid full mode. When used in series they can be connected through means such as for example through one or more settling legs of the first reactor. The produced polymer may be withdrawn from the loop reactor along with some diluent through at least one settling leg in which the solid content is increased with respect to its concentration in the body of the reactor.

Settling legs may be in continuous fluid connection with the "product recovery zone". As used herein "product recovery zone" includes but is not limited to heated or not heated flash lines, flash tank, cyclones, filters and the associated vapor recovery and solids recovery systems or transfer lines to another reactor or said other reactor when several reactors are connected in series.

When no reactor is present downstream of the settling legs, the extracted slurry may be depressurized and transferred through for example heated or not heated flash lines to a flash tank where the polymer and the unreacted monomer and/or co-monomers and diluent are separated. The degassing of the polymer may be further completed in a purge column.

When at least one reactor is present downstream of the settling legs, the extracted slurry is transferred through transfer lines to the next reactor. Transfer is made possible by injecting the slurry in the downstream reactor in a point where the pressure is lower than the pressure at the outlet of the settling legs.

The present invention more particularly relates to a polymerization process for producing olefin polymers in a loop reactor as described above, said process comprising one or more cycles of:

(a) allowing said polymer slurry to settle in one or more settling legs connected to said reactor, (b) monitoring the volume of polymer slurry settled in a settling leg since its previous discharge, (c) discharging from said sewing leg, a predetermined volume of polymer slurry substantially equal to the volume of polymer slurry settled in said settling leg since its previous discharge.

As used herein the term "substantially equal" refers to a volume ±20% equal to the volume of slurry settled in a given settling leg.

As used herein the term "equal" refers to a volume ±5% equal to the volume of slurry settled in a given settling leg.

In an embodiment of the present invention, a predetermined volume of polymer slurry can be discharged which is equal to the volume of polymer slurry settled in a given settling leg since its previous discharge. In another embodiment, a predetermined volume of polymer slurry can be discharged which is superior to the volume of polymer slurry settled in said settling leg since its previous discharge.

The process according to the present invention presents several advantages over the prior art such as allowing for an optimized discharge of settled slurry from settling legs to a product recovery zone. The present process allows the settling legs to be completely emptied from settled materials at each discharge without substantially discharging further unsettled slurry that would impose a severe overload to the fluid recycling section for a minimal additional polymer production.

In one embodiment, the present process is further characterized in that it comprises one or more cycles of: (a) allowing said polymer slurry to settle in one or more settling legs connected to said reactor, (b) assessing the time T required for the settling of a predetermined volume of polymer slurry in a given settling leg after the previous dosing of that given settling leg, (c) triggering the discharge of said predetermined volume of settled polymer slurry from said given settling leg into a product recovery zone at said time T after the previous dosing of said leg, and (d) discharging during a predetermined period Δt, said predetermined volume of settled polymer slurry from said settling leg, wherein said predetermined volume is substantially equal to the volume of polymer slurry settled in said settling leg since its previous discharge.

In another embodiment, the present process is further characterized in that it comprises one or more cycles of (a) allowing said polymer slurry to settle in one or more settling legs connected to said reactor, (b) evaluating the volume of polymer settled in a leg since its previous discharge, (c) adjusting the opening speed of the valve and/or the aperture of a flow adjusting device so that the volume discharged from the leg is substantially equal to the evaluated settled volume.

According to an embodiment of the present invention, said process comprises the step of adjusting the opening time of a settling leg such that the volume of polymer slurry to be discharged from said settling leg is substantially equal to the volume of polymer slurry settled in said settling leg since its previous discharge.

According to another embodiment of the present invention, said process comprises the step of adjusting the time between two discharges for a settling leg such that the volume of polymer slurry to be discharged from said settling leg is substantially equal to the volume of polymer slurry settled in said settling leg since its previous discharge.

According to yet another embodiment of the present invention, said process comprises the step of adjusting the discharge aperture of a settling leg such that the volume of polymer slurry to be discharged from said settling leg is substantially equal to the volume of polymer slurry settled in said settling leg since its previous discharge.

The present processes can be suitably performed in conventional single and double loop reactor. In the case of a single loop reactor the present invention facilitates the treatment of the recycle stream. In the case of a double loop reactor the present invention minimizes the transfer of comonomer into the second reactor. The present invention further encompasses single and double loop reactors comprising adequate measurement means suitable for inferring the settling characteristics in each settling leg and the volume of settled shiny inside said legs and valve control means in operative connection with the settlings legs of said reactor.

Referring now to the drawings, FIG. 1 schematically illustrates an example of a loop reactor 1 for use in the invention. Said loop reactor 1 comprises a plurality of interconnected pipes 9. It will be understood that while the loop reactor 1 is illustrated with six vertical pipes, said loop reactor 1 may be equipped with less or more pipes, such as 4 or more pipes, for example between 4 and 20 vertical pipes. The vertical sections of the pipe segments 9 are preferably provided with heat jackets 10. Polymerization heat can be extracted by means of cooling water circulating in these jackets of the reactor. Reactants are introduced into the reactor 1 by line 3. Catalyst, optionally in conjunction with a co-catalyst or activation agent, is injected in the reactor 1 by means of the conduct 17. It is to be understood that FIG. 1 is a simplified illustration of a loop reactor and that said diluent, co-monomers, monomers, catalysts and other additives may enter the reactor separately. In a preferred embodiment as illustrated herein, catalysts are introduced just upstream from the circulation pump 2, diluent, monomer, potential co-monomers and reaction additives just downstream of the circulation pump 2.

The polymerization slurry is directionally circulated throughout the loop reactor 1 as illustrated by the arrows 6 by one or more pumps, such as axial flow pump 2. The pump may be powered by an electric motor 5. As used herein the term "pump" includes any device from compressing driving, raising the pressure of a fluid, by means for example of a piston or set of rotating impellers 4.

The reactor 1 is further provided with one or more settling legs 7 connected to the pipes 9 of the reactor 1. Although only five settling legs 7A to 7E are illustrated in FIG. 1, the present process encompasses a loop reactor comprising one or more settling legs. In an embodiment of the present invention, said loop reactor comprises 1 to 20 settling legs, preferably 4 to 12 settling lags, more preferably 6 to 10 settling legs.

The settling legs 7 are preferably provided with an isolation valve 19. These valves 19 may be ball valves for example. These valves 19 are open under normal conditions and can be closed for example to isolate a settling leg from operation. Said valves can be closed when the reactor pressure falls below a chosen value.

Furthermore, the settling legs can be provided with product take off or discharge valves 15. The discharge valve 15 may be any type of valve, which can permit continuous or periodical discharge of polymer slurry, when it is fully open. Polymer slurry settled in the settling legs 7 may be removed by means of one or more product recovery lines 8, e.g. to a product recovery zone.

The discharge valve 15 that can be used in this invention may be any type of valve which can permit continuous or periodical discharge of a polymer slurry, when it is fully open. An angle valve, or ball valves may be suitably used. For example, the valve may have such a structure that solid matter is prevented from accumulating or precipitating at the main body portion of the valve. However, the type and structure of the discharge valve can be selected by those skilled in the art as required.

Said loop reactor 1 further comprises measuring means 21, one or more, located on the leg and/or on the reactor, that allow inferring the settling characteristics in each settling leg and valve control means 22 in operative communication with said measuring means 21 and with the valves 15 of the settling legs 7. Any conventional measuring device may be used to infer the volume of polymer slurry settled in the settling legs 7, which may then transmit a signal to the valve control means 22 to for example discharge the settled volume, when a predetermined volume is reached in a given settling leg. Examples of suitable devices include but are not limited to gamma ray density gauge, or level radiography devices or sonometric measuring devices. Those measures may be either directly transmitted to the valve control means or be input to a mathematical or statistical model whose output is transmitted to the valve control means.

Figure 2:
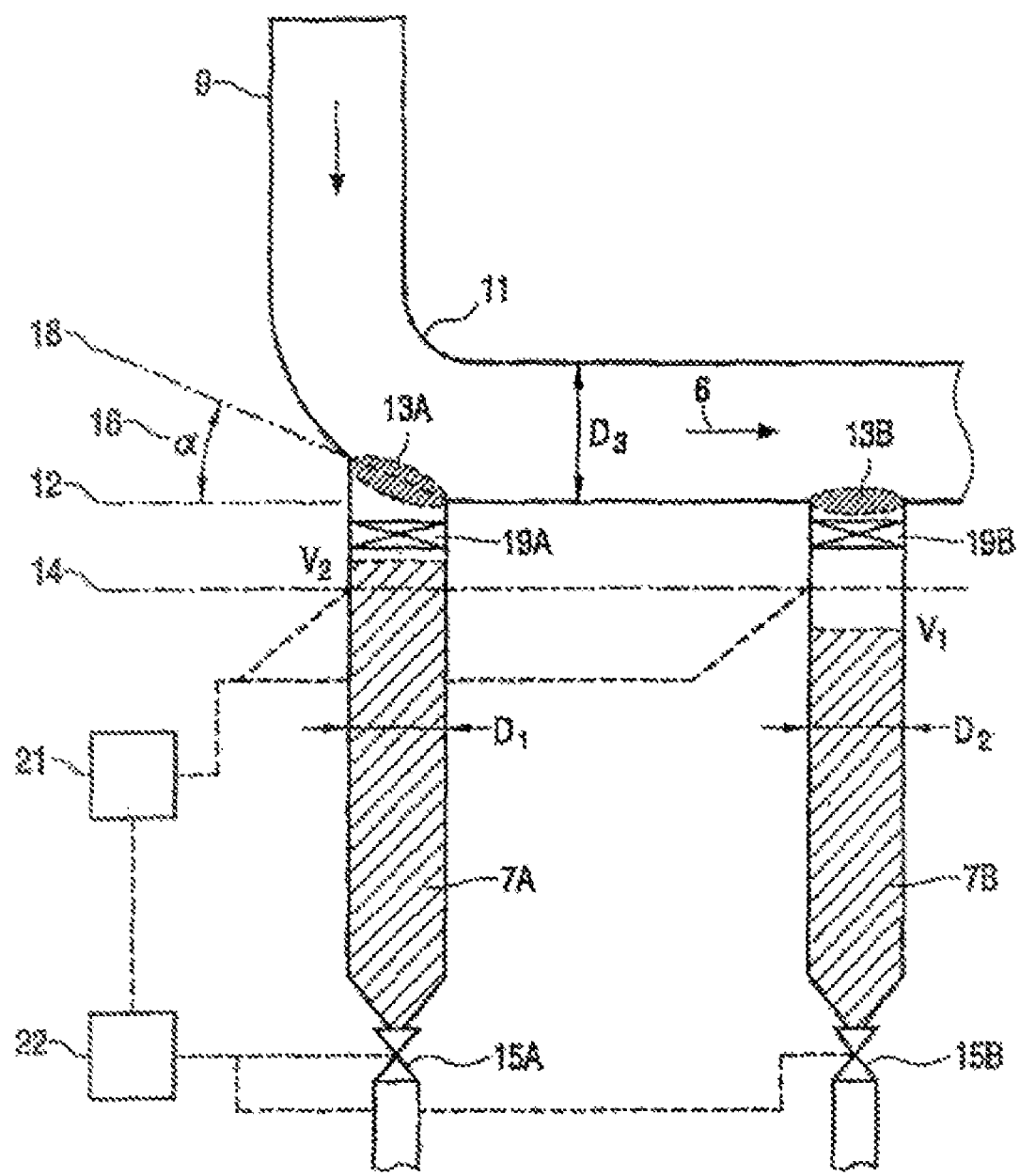
FIG. 2 represents a schematic cross-sectional side view of a section of the loop reactor of FIG. 1, showing two settling legs positioned on said section with their connection to said section having different angles alpha from a horizontal line.

FIG. 2 illustrates a section of the loop reactor 1 of FIG. 1. Two settling legs 7A and 7B are connected to a section of said reactor, the settling leg 7A with area of contact 13A and settling leg 7B with the area of contact 13B. Said settling legs 7A and 7B are also illustrated respectively with arbitrary volume V1 and V2. The settling leg 7A located on the curved section 11 of the reactor may have a diameter D1 identical to the diameter D2 of the settling leg 7B located on a straight section of said reactor. However, due to its position characterized by the angle alpha 18, delimited from a horizontal line 12 by the line 18, the settling leg 7A has different settling characteristics compared to settling leg 7B. Its location in the curved portion of the pipe 9 modifies the amount of polymer slurry settling in settling leg 7A compared to settling leg 7B, for a given time T. Due to the positioning of the leg 7A in the elbow section of the reactor, said settling leg is not equivalent in term of settling rate with the other settling legs. More precisely, the rate at which the slurry settles in the bottom part of a settling leg is not equal for all the legs.

When setting the parameters of the present process the volume of sealed slurry in each settling leg can be inferred using measurements means 21. The measurements means 21 can indicate, directly or through the use of a mathematical or statistical model when the settled polymer slurry depth is outside the desired range arbitrarily represented by line 14. At this time, a signal is transmitted to the valve control means 22. The valve control means will then actuate the discharge valve 15 of said settling legs and thereby control the discharge of the settled polymer slurry from said settling legs.

In said settling legs 7 the polymerization slurry decants so that the slurry exiting the reactor is more concentrated in solid than the circulating slurry. Its concentration is actually as high as it can be because in the settled phase the polymer solid particles are in close contact to each other. The liquid phase occupies only the solids internal and inter-granular porosity. The present process and reactor allow the optimized discharge of settled slurry from said settling leg, and therefore permit to limit the quantity of diluent that has to be treated and re-fed to the reactor. Typically settled polymer slurry comprises from 60 to 65% of polymer particles, whereas the unsettled slurry in said leg comprises from 30 to 45% of polymer particles.

According to an embodiment of the present invention, when a predetermined volume of settled polymer slurry is reached in a given settling leg at time T, the discharge of that particular leg is triggered. The settling leg is actuated during a time Δt required to allow the complete discharge of said predetermined volume.

Said volume V can be efficiently discharged by adjusting the opening time of said given settling leg. In another embodiment, said volume V can be efficiently discharged by adjusting the discharge aperture of said given settling leg so as to limit the volume discharged from said leg to the volume V. In an embodiment of the present invention, the discharge of said settled polymer slurry from said settling legs is triggered when said settled slurry has reached an optimum predetermined volume in said settling legs.

Adjusting the discharge aperture of a given settling leg includes but is not limited to reducing or enlarging the size of the opening of a discharge valve, or adding downstream of said discharge valve another flow regulating device of adjustable smaller aperture or an adjustable reduction of smaller aperture.

The present process encompasses any measuring means able to determine the volume of settled slurry at a time T in a settling leg. The monitoring step can be performed using measuring means selected from the group comprising level radiography means and gamma ray probes or using models.

Discharging said settled polymer slurry from said settling legs through discharge valves into a product recovery zone, is performed in such a way that the volume discharged from a settling leg is substantially equal to the volume of polymer slurry settled in said settling leg since its previous discharge.

According to the present invention, the actuation of the discharge valve is controlled by valve control means 22 which can be also operatively connected with said volume control means 21 for example. The valve control means 22 allow the adjustment and the control of the periodical opening at predetermined frequencies and sequence of the settling legs to permit the continuous or periodical discharge of said polymer slurry. Other control means such as pressure controllers and flow controllers, flow transducers and flow sensors may be used to further fine-tune the discharging process.

The process and reactor according to the invention, provides the advantage of optimizing the discharge of settled polymer slurry from a given settling leg without discharging further unsettled slurry thereby reducing the amount of diluent to be recycled, and further reducing the operation costs.

In another embodiment, the loop reactor according to the present invention comprises settling legs wherein the area of contact between said settling leg and said reactor pipe is at an angle alpha within the range of 0° to 60° from a horizontal line.

The present invention also encompasses a loop reactor suitable for an olefin polymerization process comprising two or more settling legs connected to the pipes of said reactor, wherein the effective volume or the settling rate of at least one settling leg is substantially different from the effective volume or the settling rate of at least another settling leg.

As used herein the term "effective volume" refers to the volume of polymer slurry which may settle into a settling leg if the settling is continuously under the same circulation conditions in the reactor. This effective volume may be smaller than the total settling leg volume because turbulence created on the top of the leg will prevent settling up to the top of the leg.

As used herein, the term settling rate refers to the volume of the currently produced polymer that may settle in a given settling leg per unit of time when the settled volume is 50% of the previously defined effective volume.

As used herein the term "substantially different" refers to a difference larger than 2%.

The present invention also encompasses a loop reactor as described above wherein the settling legs are modified and/or designed such as to obtain a substantially different settling rate and/or settling volume in each settling leg.

In an embodiment of the present invention, the loop reactor comprises sewing legs having an internal diameter within the range of 0.2 to 0.5 times the internal diameter $D_3$ of the pipes of said reactor.

In another embodiment of the present invention, the settling legs connected to a section of said loop reactor may have an internal diameter within the range of 0.3 to 0.5 times the internal diameter of said reactor pipe section.

The present invention is particularly suited for the discharge of multiple loop reactors connected in series.

Figure 3:
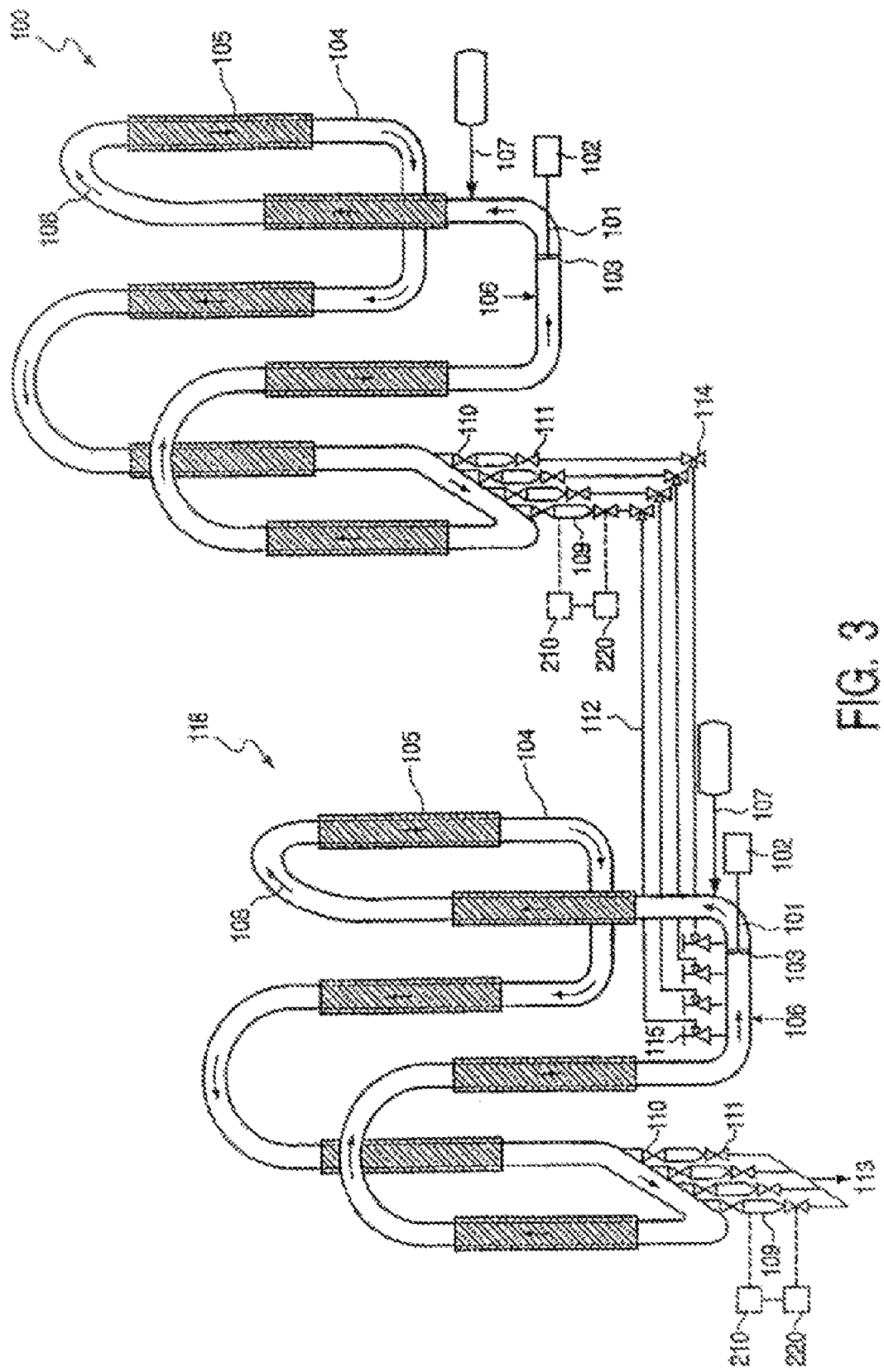
FIG. 3 is a schematic representation of a double loop polymerization reactor according to an embodiment of the present invention.

FIG. 3 represents a double loop reactor 100/116, comprising two single loop reactors 100, 116, which are interconnected in series. Both reactors 100, 116 consist of a plurality of interconnected pipes 104. The vertical sections of the pipe segments 104 are preferably provided with heat Jackets 105. Reactants are introduced into the reactors 100 by line 107. Catalyst, optionally in conjunction with a co-catalyst or activation agent, may be injected in one or both of the reactors 100 and 116 by means of conduct 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with a set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111 or can be in direct communication with the downstream section. Downstream the exit of the settling leg 109 of reactor 100, a transfer line 112 is provided which allows to transfer polymer slurry settled in the settling legs 109 to the other reactor 116, preferably through a piston valve 115. Along the transfer line 112, a three-way valve 114 may divert the flow to a product recovery zone if the multiple loop reactor has to be used in a parallel configuration. Polymer slurry settled in the settling legs 109 of reactor 116 can be removed by means of one or more product recovery lines 113, e.g. to a product recovery zone.

Both reactors 100 and 106 and/or their respective settling legs are furthermore operatively connected to measurements means 210, which are further directly or through mathematical or statistical models in operative communication with valve control means 220.

The present invention encompasses different types of measurements means and valve control means, which can accomplish the purpose of the invention. The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

The actuation and the control of a periodical discharging process can be implemented using electrical analog, digital electronic, pneumatic, hydraulic, mechanical or other similar types of equipment or combinations of one or more such equipment types. A computational means is used in the preferred embodiment of this invention to operate and control the process parameters. Computers or other types of computing devices can be used in the invention.

The present invention also relates to computational means comprising a process controller operatively connected to the discharge valves of said sewing legs.

The present processes and reactors allow the discharge of each settling leg at a different time and for a different time period, thereby controlling the volume of polymer slurry to be discharged from said leg such that said discharged volume is substantially equal to the volume of polymer slurry settled in said settling leg since the previous discharge of said leg without substantially discharging further unsettled slurry.

Adjusting the opening duration of the discharge valve of each sewing leg can be a function of (a) the position of each settling leg on the loop reactor, and/or (b) the geometrical characteristic of each settling leg, and/or (c) the volume of settled polymer slurry in each settling leg.

This provides the advantage of optimizing the discharge of settled polymer slurry from a given settling leg without discharging further unsettled slurry thereby reducing the amount of diluent to be recycled, and further reducing the operation costs.

Although the present invention has been described with considerable detail with reference to certain preferred variations thereof, other variations are possible. Therefore, the spirit and scope of the appended claims should not be limited to the preferred variations described herein.

The invention claimed is:

1. A method for the polymerization of an olefin monomer in a loop reactor system comprising:
   a) introducing an olefin monomer and a diluent carrier liquid into a reactor system comprising at least one loop reactor;
   b) supplying at least one polymerization catalyst system to said reactor system;
   c) circulating said diluent liquid and olefin monomer through said loop reactor while polymerizing said olefin monomer in the presence of said catalyst system to produce a slurry of polymer particles in said diluent carrier liquid;
   d) diverting a portion of the slurry through said loop reactor into a settling leg connected to said loop reactor and having a lower discharge valve which is repeatedly operated through a cycle or operation in which said discharge valve is opened to discharge settled polymer slurry from said settling leg and thereafter closed to allow polymer slurry to accumulate in said settling leg; and
   e) controlling the operation of said discharge valve to discharge a volume of slurry from said settling leg through a discharge aperture which volume is within the range of 20 volume percent of the volume of slurry settled in said settling leg since the discharge of slurry from said settling leg in a previous cycle of operation; and
   f) monitoring the volume of slurry in said settling leg since the discharge of slurry from said settling leg in the previous cycle of operation, generating a signal representative of the monitored volume and discharging a predetermined volume of the slurry from said settling leg in response to said monitoring signal.

2. The method of claim 1 wherein the volume of slurry discharged from said settling leg is within the range of 15 volume percent of the volume settled in said settling leg since the discharge or slurry from said settling leg in the previous cycle of operation.

3. The method of claim 1 wherein the volume of slurry discharged from said settling leg is within the range of 10 volume percent of the volume settled in said settling leg since the discharge or slurry from said settling leg in the previous cycle of operation.

4. The method of claim 1 wherein the volume of slurry discharged from said settling leg is within the range of 5 volume percent of the volume settled in said settling leg since the discharge or slurry from said settling leg in the previous cycle of operation.

5. The method of claim 1 further comprising determining the time required for the settling of a predetermined volume of polymer slurry in said settling leg and discharging said slurry upon the elapse of said time, whereby said volume of slurry discharged is substantially equal to the predetermined volume of the polymer slurry settled in said settling leg since the previous discharge in a previous cycle of operation.

6. The method of claim 1 wherein the volume of slurry discharged from said settling leg is controlled by varying the opening of said discharge aperture.

7. The method of claim 1 wherein the volume of slurry discharged from said settling leg is controlled by adjusting the time of opening of said discharge valve.

* * * * *